(12) United States Patent
Park

(10) Patent No.: US 7,515,706 B2
(45) Date of Patent: Apr. 7, 2009

(54) HEADSET WITH RETRACTABLE CORD FOR PORTABLE DEVICES WITH AUTOMATIC SWITCHING CAPABILITY

(75) Inventor: Jeekyoung Park, Irvine, CA (US)

(73) Assignee: Gateway Inc., Irvine, CA (US)

( * ) Notice: Subject to any disclaimer, the term of this patent is extended or adjusted under 35 U.S.C. 154(b) by 604 days.

(21) Appl. No.: 11/284,701

(22) Filed: Nov. 22, 2005

(65) Prior Publication Data

US 2007/0121985 A1 May 31, 2007

(51) Int. Cl.
*H04M 1/00* (2006.01)
*H04M 9/00* (2006.01)
*H04R 25/00* (2006.01)

(52) U.S. Cl. ............ 379/430; 455/575.2; 381/370

(58) Field of Classification Search ........ 381/370, 381/384; 379/420.02–420.04, 433.02, 433.05, 379/430, 441; 455/568.1, 575.2
See application file for complete search history.

(56) References Cited

U.S. PATENT DOCUMENTS 6,188,837 B1 * 2/2001 Kwan ............... 392/385
6,419,506 B2   7/2002 Jones et al.
6,731,956 B2   5/2004 Hanna et al.
2003/0165237 A1 * 9/2003 Farr et al. ............ 379/430

FOREIGN PATENT DOCUMENTS

WO    WO 02/078394 A1   10/2002

OTHER PUBLICATIONS

Brooke Clarke, SB-22 Switchboard, printed from www.pacificsites.com/~brooke/SB22.shtml website, printed Apr. 18, 2005, 1-7, United States.
GI Joe Talking Astronaut, printed from www.users.vance.net/grayarea/1203talkastroph.html, printed on Apr. 18, 2005, 1-3, United States.

* cited by examiner

*Primary Examiner*—Tuan D Nguyen

(57) ABSTRACT

A headset with retractable cord for portable devices with automatic switching capability system, comprising an electronic device, a headset, a cord extending between the electronic device and the headset, and a retracting assembly for retracting the cord into a coil during periods of non-use. Optionally, the system includes a retraction detection assembly for determining a condition of retraction of the cord with respect to the electronic device.

14 Claims, 4 Drawing Sheets

HEADSET WITH RETRACTABLE CORD FOR PORTABLE DEVICES WITH AUTOMATIC SWITCHING CAPABILITY

BACKGROUND OF THE INVENTION

1. Field of the Invention

The present invention relates to audio reproduction devices that utilize headsets, and more particularly pertains to a new retractable headset for portable devices with an automatic switching capability that not only takes the cord of the headset out of the way but can influence the operation of the portable device based upon the extension or retraction condition of the headset.

2. Description of the Prior Art

Portable electronic devices that produce sound have become increasingly popular, and typically these devices rely upon headphones or headsets to reproduce prerecorded sound, and even to capture sound for the purpose of recording the sound or merely transmitting the sound when the device is a communication device such as a cellular telephone. The headset is typically physically and electrically connected to the electronic device by at least one, and sometimes two, cords, which carry the electrical signals from the device to speakers in the headset, and may also carry electrical signals from a microphone associated with the headset to the device. The cord tends to be an impediment to use of the device, as even as the devices and the headsets become increasing smaller due to miniaturization, especially during periods of non-use of the device, as the cord remains present and must be wrapped about the headset or the device until the device and headset are used again.

Recently, wireless transmissions have been employed between the device and the associated headset (using, for example, Bluetooth capabilities), which has eliminated the need for the cord in those devices. However, this approach has raised a number of new problems, such as the need to employ circuitry and a power supply on the headset to enable these transmissions. These added components increase the weight of the headset compared to those that only house a speaker, and this increased weight can make the headset less comfortable to wear on the ear, as well as making it more difficult to securely hold the headset on the head of the wearer. Additionally, both the device and the headset must be compatible for such wireless transmissions, and thus the user is restricted in the ability to use different headsets with different devices unless both the headset and the device conform to the same wireless transmission standard.

It thus would be desirable to find a solution that removes the problem of the cord when the device and headset are not actively being used, yet does not make the headset more difficult or uncomfortable to use.

SUMMARY OF THE INVENTION

The present invention provides a new retractable headset for portable devices that permits the cord of the headset to be retracted when the headset is not in use and extended when the headset is to be used, and may include an automatic switching capability is controlled by the retraction condition of the cord.

To attain this, the present invention generally comprises a system that includes an electronic device, a headset, a cord that extends between the electronic device and the headset, and retracting means for retracting the cord into a coil during periods of non-use. The retracting means is preferably, but not necessarily, located on the electronic device, and may be located in the interior of a housing of the electronic device, but may be integrated into other items, such as a carrying case for removably receiving the electronic device.

This is a general outline of the more important features of the invention, and the detailed description of this application that follows discloses additional features of the invention which will form the subject matter of the claims appended hereto.

One significant feature of the present invention is the ability of the cord to be retracted into the housing of an electronic device, thus removing the cord from interference with other objects and the body of the user. Further, the retraction detection assembly may detect the condition of retraction of the cord, and send a signal that influences the operation of the electronic device, such as by affecting the power status or the "on-hook" status of the device when the device is a communication device.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
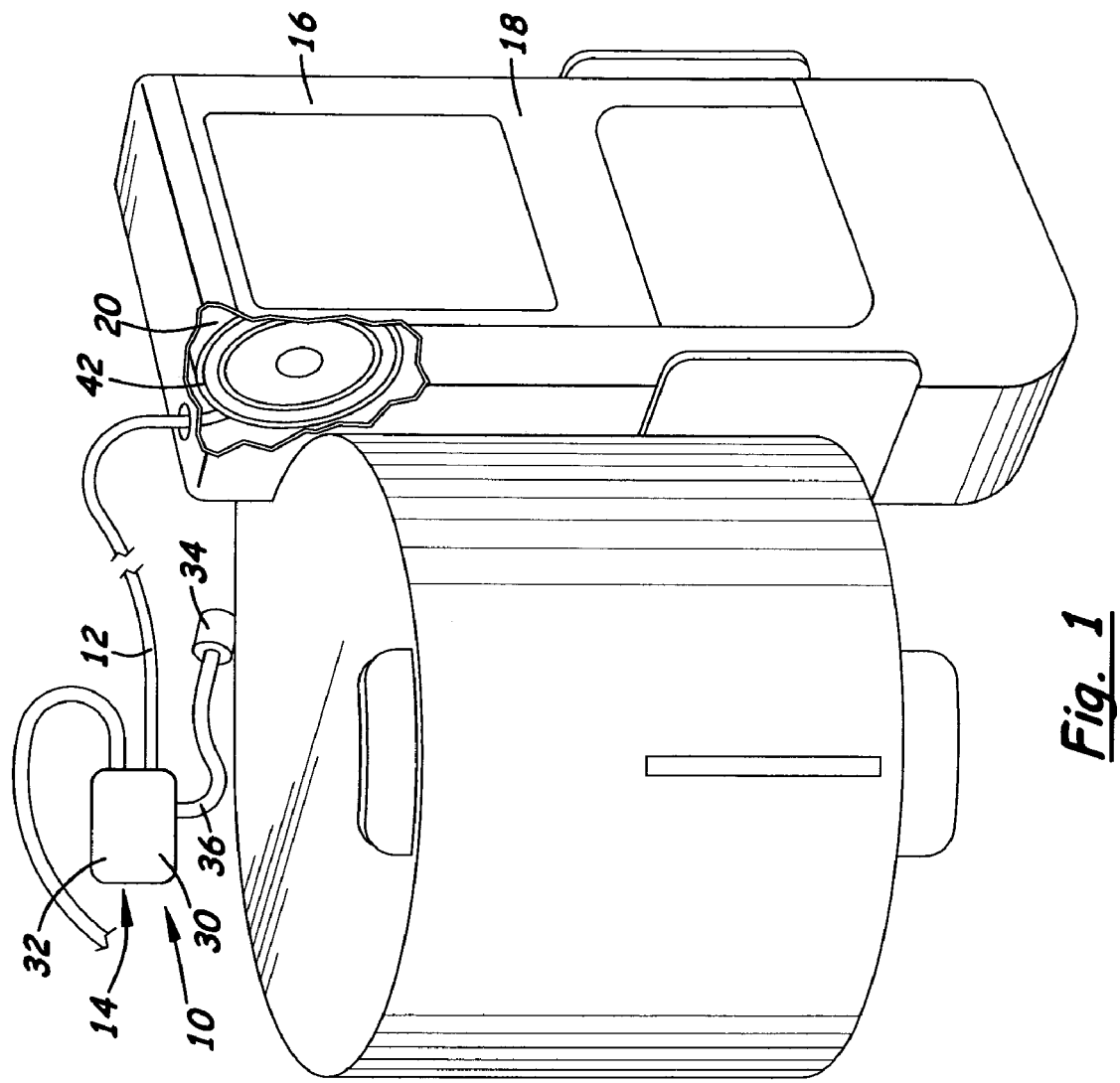
FIG. 1 is a schematic perspective view of a new system of a portable device and headset with retractable cord according to the present invention, showing the cord in an extended condition.
Figure 2:
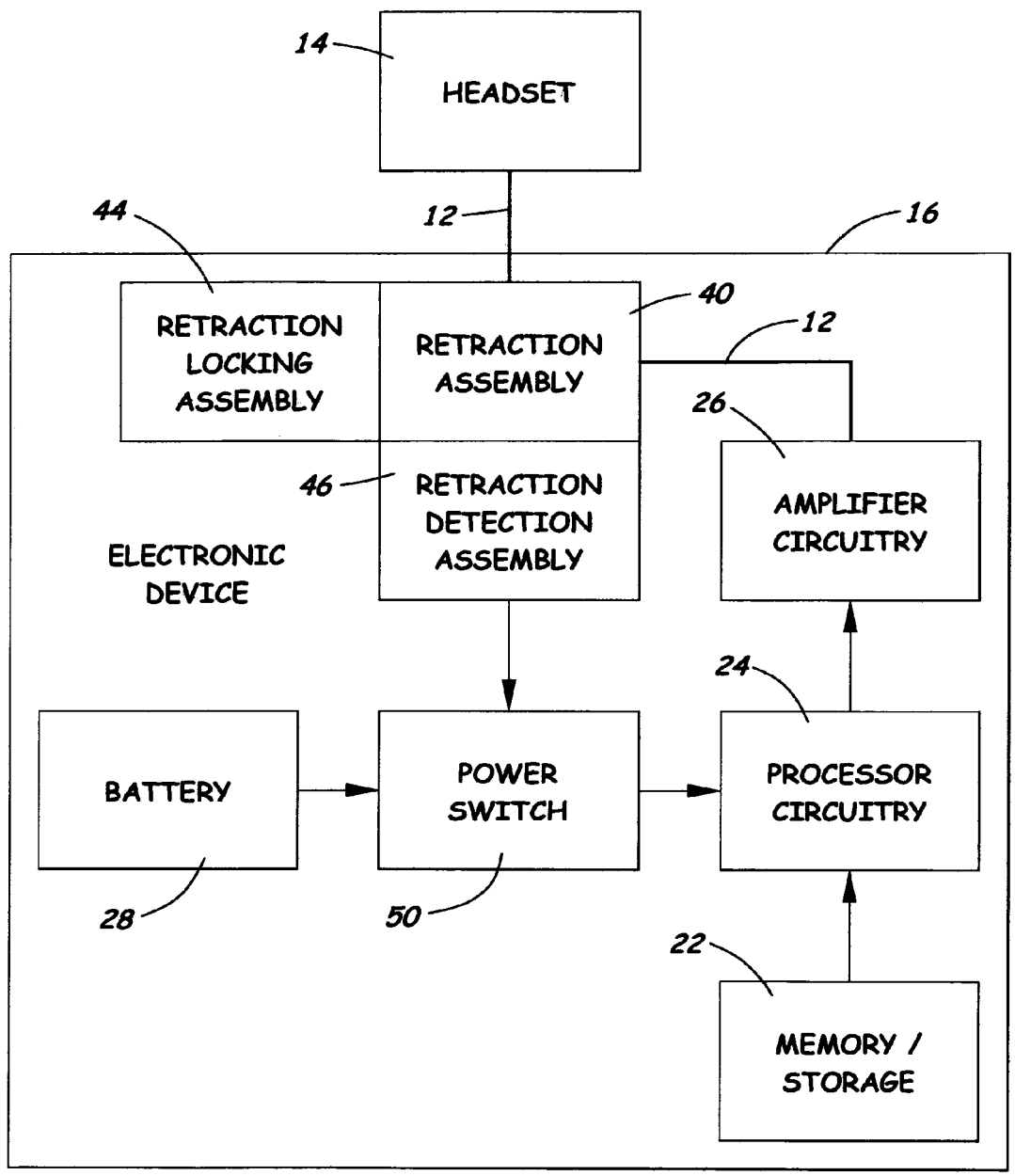
FIG. 2 is a schematic diagram of the elements of the present invention.

With reference now to the drawings, and in particular to FIGS. 1 through 4 thereof, a new retractable headset for portable devices with auto on/off feature embodying the principles and concepts of the present invention and generally designated by the reference numeral 10 will be described.

The present invention is generally directed to a system 10 (See FIG. 1) for conveniently storing a cord 12 that connects a headset 14 to an electronic playback device 16, such as an audio or video player device, or a communications device, such as a cellular or portable telephone, or a game playing device, or virtually any other device that produces electrical sound signals to be converted to audible sounds by the headset.

In one embodiment of the invention, in which the system is incorporated into an electronic device 16, the electronic device includes a housing 18 that defines an interior 20 that contains circuitry. The circuitry that is enclosed in the interior may include, for example, a memory 22 that is employed for storing signals that represent sounds, such as music files (see FIG. 2). The memory 22 may be in the form of one or more random access memory (RAM) chips or hard disk drive storage. Additionally, or alternatively, the electronic device 16 may include a media reader for reading data from a removable media memory device that is easily removable and re-insertable in the reader for quick interchange of the music files. The electronic device 16 may also include processing circuitry 24 and amplifier circuitry 26 for processing and amplifying the signals retrieved from the various forms of memory. Further, the electronic device 16 may also include a battery 28 located in the interior 20 of the housing for providing power to the various components of the device. The battery 28 may be rechargeable, or may be replaceable with disposable batteries.

As illustratively shown in FIG. 1, the headset 14 may comprise at least one earpiece 30. Optionally, the headset 14 could include a pair of earpieces that are linked by a semi-rigid band that is designed to extend about the head of the user. Each earpiece 30 may include a case 32 that is configured to be positioned adjacent to, or on, the ear of the user. In one embodiment of the invention, at least a portion of the case 32 of the earpiece is capable of insertion into the ear of the user. The case 32 defines an interior in which a speaker (or other sound transducer) for reproducing audible sounds from electrical signals is located, and has at least one aperture formed through the case between the interior and an exterior and of the case. In some embodiments, the headset may also include a microphone 34 for receiving and converting audible sounds into electrical signals. The microphone 34 may be mounted on the case, such as by being mounted on a stalk 36 extending from the case 32.

The system 10 of the invention also includes the cord 12 that extends between the audio device 16 and the headset 14. The cord 12 is in electrical communication with the speaker of the one or more earpieces 30 of the headset 14, and the amplifier circuitry 26 of the electronic device, through, for example, a pair of electrical conductors in the cord, such as metal wires.

The system 10 further includes a retracting assembly 40 as means for retracting the cord into a stored condition, such as, for example, a coiled condition, during periods of non-use of the headset 14. The retracting assembly 40 preferably tends to resist extension of the cord 12 from the retracting assembly, and tends to retract or wind the cord. In the illustrative embodiment of the invention, the retracting assembly 40 includes a spool 42 that has at least a portion of the cord 12 being wrapped or wound thereabout. The spool 42 is mounted in a manner that permits the spool to rotate to dispense or receive the cord. The retraction assembly 40 may also include a locking assembly 44 as a means for releasably locking the spool 42 at a selected rotational position to thereby maintain extension of a selected amount of the cord from the housing. The locking assembly 44 may be any structure known in the art to achieve the desired locking function, such as, for example, a ratchet and pawl mechanism, although other structures may be employed. Structures that produce this function are well-known and will not be described here, and some examples of structures that provide this function are disclosed in U.S. Pat. No. 3,617,659 and U.S. Pat. No. 3,715,526, each of which is incorporated herein in their entirety by reference.

In one embodiment of the invention, the retracting assembly 40 is located in the interior 20 of the housing 18 of the electronic device 16 (see FIG, 1), so that the cord 12 is stored in the interior of the housing and is withdrawn from the interior of the housing during times of use of the headset 14, and is retractable back into the interior of the housing when the headset is not in use.

The system of the invention may also include a retraction detection assembly 46 as means for determining a condition of the extension or retraction of the cord 12 relative to the housing 18. The extension detection assembly 46 is capable of detecting at least when the cord is substantially fully retracted, and when it is not substantially fully retracted. These two conditions may correspond to a period of non-use of the headset 14 (and the electronic device), and to a period of use of the headset (and the device), based upon the assumption that the device 16 is not being used when the cord is substantially fully retracted, and is being used when the cord has been extended from the retraction assembly 40 to an extent that the cord is not substantially fully retracted. Optionally, the retraction detection assembly may detect the degree of extension of the cord to a more precise measurement, but such precision is not believed to be necessary for suitable operation of the invention.

The retraction detection assembly 46 may generate and output a signal that is indicative of the condition of retraction (or substantial retraction) of the cord onto the retraction assembly 40, and into the housing 18. The signal may be generated in any suitable manner know to those of ordinary skill in the art. For example, a proximity detector may detect the proximity of the end of the cord that is attached to the headset to the housing, and may produce a signal when the end of the cord is moved out of proximity from the housing. As another example, the number of rotations of the spool may be counted by a suitable counting means, and the signal may be produced when the count corresponding to substantially full retraction is not detected. In another example, the end of the cord adjacent to the headset may be configured to depress a switch on the housing when that end is adjacent to the housing, and the switch opens when the switch is depressed. These are but a few examples of the different structures that may be employed to detect the retraction condition of the cord, and those skilled in the art are aware of other structures that may also be suitably employed.

Figure 3:
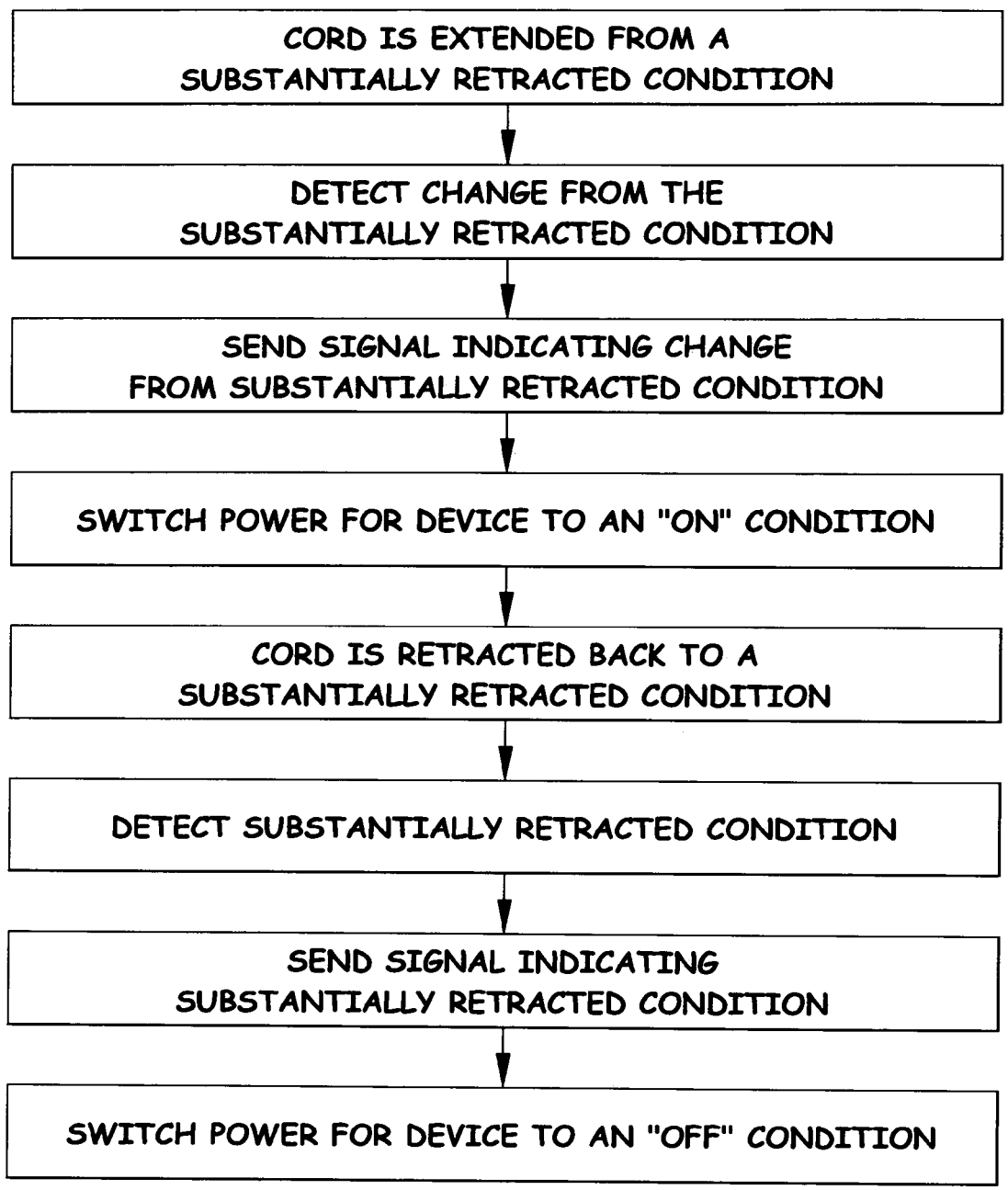
FIG. 3 is a schematic flow diagram of one implementation of the present invention.
Figure 4:
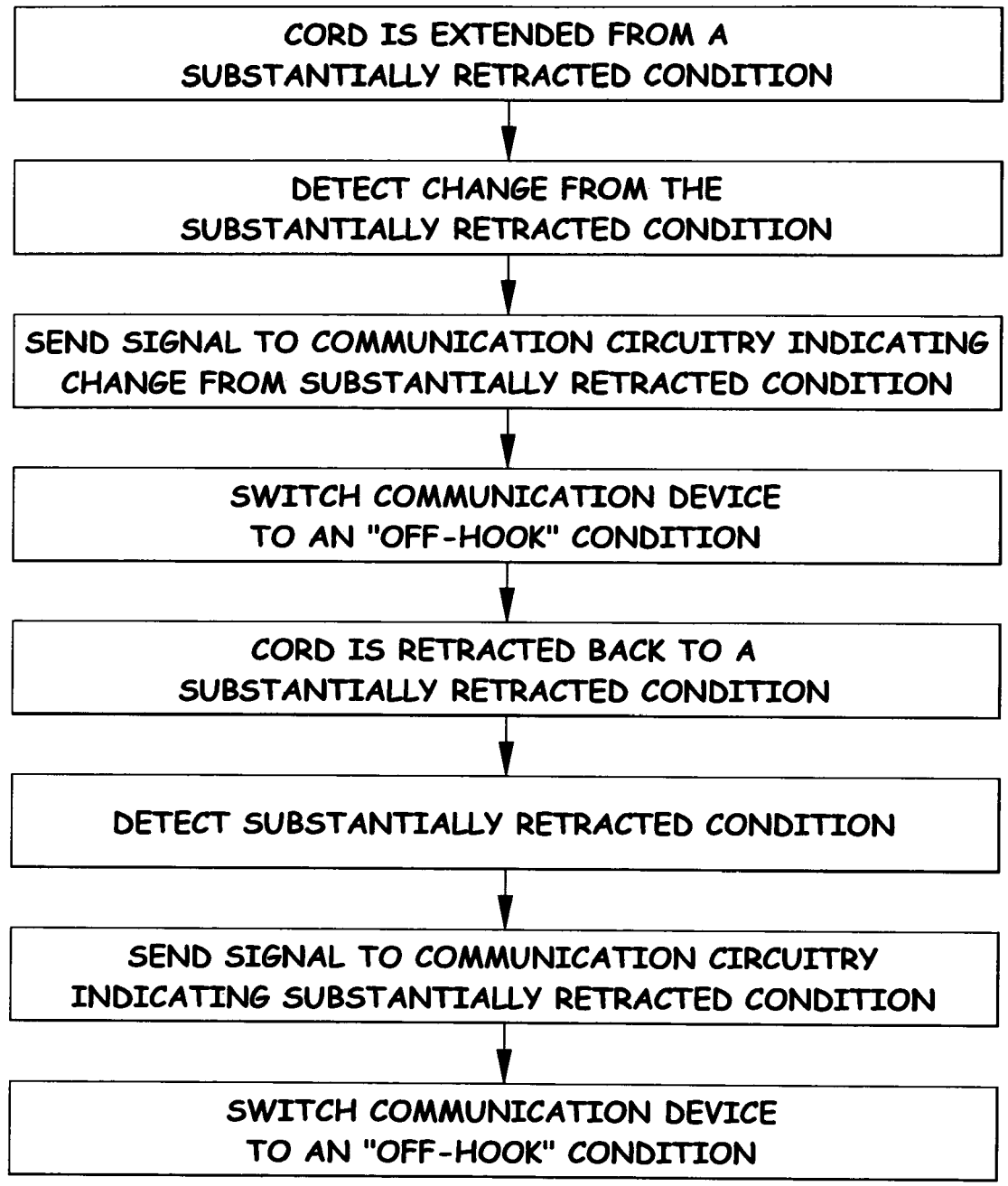
FIG. 4 is a schematic flow diagram of another implementation of the present invention.

The signal output generated by the retraction detection assembly 46 may be sent to circuitry capable of affecting or controlling some aspect of the operation of the electronic device (see FIGS. 3 and 4). For example, the signal may be sent to, and used to control, a switch 50 that controls some aspect of the operation of the device 16. Illustratively, the signal from the retraction detection assembly 46 may cause the switch 50 to assume a power-off condition when the signal indicates that the cord is in a substantially retracted condition, which may thus be used to power down the device and turn the device "off." Conversely, the signal from the retraction detection assembly 46 may cause the switch to assume a power-on condition when the signal indicates that the cord 12 is not in the substantially retracted condition, which may thus be used to power up the device and turn the device "on." In an audio device implementation of the invention, the signal may be employed to turn on the power switch of the audio device, and may optionally initiate playback of an audio file or even a video file, if the electronic device is a video playback device.

The signal may also be used for controlling functions of the device when it is operational. For example, when applied to an electronic device 16 which includes cellular or other wireless (or wired) communication functions, the signal may be employed to control the "on-hook" and "off-hook" condition of the telephone function. In such an implementation, the signal causes the communication circuitry of the telephone to assume an on-hook condition when the signal from the retraction detection circuitry indicates that the cord is in a substantially retracted condition. Conversely, the signal causes the communication circuitry of the telephone to assume an off-hook condition when the signal from the retraction detection circuitry indicates that the cord is not in the substantially retracted condition. In this implementation, the user may "answer" an incoming telephone call (indicated by, for example, a sound or vibration) by extending the retracted cord and placing the headset on the user's head, and the user may hang up on an ongoing call by retracting the cord into a substantially retracted condition.

In an optional variation of the invention, rather than the retraction assembly 40 being located in the housing of the electronic device 16, the retracting assembly 40 is located in a cover or case 60 that is employed to cover at least a portion of the housing of the device.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable headset system for a portable communication device, comprising: an electronic device; a headset; a cord extending between the electronic device and the headset, wherein the cord transmits an audio signal and further comprising a power switch to turn on the device when the cord is extended; retracting means for retracting the cord into a coil during periods of non-use; additionally comprising retraction detection means for determining a condition of retraction of the cord with respect to the retraction means; wherein the retraction detection means outputs a signal indicating the condition of retraction of the cord with respect to the retraction means and wherein the signal output by the retraction detection means is sent to a switch of the electronic device, the signal from the retraction detection means causing the switch to assume a power-off condition when the retraction detection means detects that the cord is in a substantially retracted condition, the signal from the retraction detection means causing the switch to assume a power-on condition when the means detects that the cord is not in the substantially retracted condition.

2. The system for claim 1 wherein the retracting means is located on the electronic device.

3. The system of claim 2 wherein the electronic device includes a housing defining an interior, and the retracting means is located in the interior of the housing.

4. The system of claim 1 additionally comprising a carrying case for removably receiving the electronic device, wherein the retracting means being located on the carrying case.

5. The system of claim 1 wherein the retracting means comprises:
   a spool having at least a portion of the cord wrapped thereabout; and
   locking means connected to the spool for releasably locking the spool at a selected rotational position to maintain extension of a selected amount of the cord from the spool.

6. The system of claim 1 wherein the electronic device comprises:
   a housing;
   a memory for storing signals representative of sounds amplifying means for amplifying signals from the memory;
   a battery for providing power.

7. The system of claim 1 wherein the headset comprises at least one earpiece.

8. The system of claim 7 wherein the headset further comprises a microphone for receiving and converting audible sounds into electrical signals.

9. The system of claim 1 wherein the signal output by the retraction detection means is sent to a switch of the electronic device, the signal from the retraction detection means causing the switch to assume an on-hook condition when the retraction detection means detects that the cord is in a substantially retracted condition, the signal from the retraction detection means causing the switch to assume an off-hook condition when the retraction detection means detects that the cord is not in the substantially retracted condition.

10. The system of claim 1 wherein the electronic device comprises:
   a housing;
   a memory for storing signals representative of sounds amplifying means for amplifying signals from the memory;
   a battery for providing power.

11. A retractable headset system for a portable communication device, comprising: an electronic device; a headset; a cord pair extending between the electronic device and the headset; a cord retracting assembly mounted on the electronic device and configured to retract the cord into a coil during periods of nonuse; a retraction detection assembly for determining a condition of retraction of the cord with respect to the electronic device; wherein the retraction detection assembly outputs a signal indicating the condition of retraction of the cord pair with respect to the electronic device and wherein the signal output by the retraction detection assembly is sent to a switch of the electronic device, the signal from the retraction detection assembly causing the switch to assume a power-off condition when the retraction detection assembly detects that the cord pair is in a substantially retracted condition, the signal from the retraction detection assembly causing the switch to assume a power-on condition when the means detects that the cord pair is not in the substantially retracted condition.

12. The system of claim 11 wherein the electronic device includes a housing defining an interior, and the cord retracting assembly is located in the interior of the housing.

13. The system of claim 11 wherein the cord retracting assembly comprises:
   a spool having at least a portion of the cord pair wrapped thereabout; and
   a locking assembly connected to the spool for releasably locking the spool at a selected rotational position to maintain extension of a selected amount of the cord pair from the spool.

14. The system of claim 11 wherein the signal output by the retraction detection assembly is sent to a switch of the electronic device, the signal from the retraction detection assembly causing the switch to assume an on-hook condition when the retraction detection assembly detects that the cord is in a substantially retracted condition, the signal from the retraction detection assembly causing the switch to assume an off-hook condition when the retraction detection assembly detects that the cord pair is not in the substantially retracted condition.

* * * * *